United States Patent
Harris et al.

(10) Patent No.: US 9,529,680 B2
(45) Date of Patent: Dec. 27, 2016

(54) VIRTUAL RESOURCE-BASED BACKUP

(71) Applicant: Verizon Patent and Licensing Inc., Arlington, VA (US)

(72) Inventors: David L. Harris, Pleasanton, CA (US); Niranjan B. Avula, Frisco, TX (US); Kirk Campbell, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 208 days.

(21) Appl. No.: 14/310,803

(22) Filed: Jun. 20, 2014

(65) Prior Publication Data

US 2015/0363278 A1 Dec. 17, 2015

Related U.S. Application Data

(60) Provisional application No. 62/013,463, filed on Jun. 17, 2014.

(51) Int. Cl.
*G06F 11/14* (2006.01)
*G06F 9/45* (2006.01)
*G06F 9/455* (2006.01)

(52) U.S. Cl.
CPC ....... *G06F 11/1469* (2013.01); *G06F 9/45558* (2013.01); *G06F 2009/45575* (2013.01); *G06F 2201/805* (2013.01)

(58) Field of Classification Search
CPC .. G06F 11/1469; G06F 9/45558; G06F 9/455; G06F 11/14; G06F 2201/805; G06F 2209/45575
See application file for complete search history.

(56) References Cited

U.S. PATENT DOCUMENTS

| 9,336,099 B1* | 5/2016 | Havemose | G06F 11/203 |
| 2009/0182929 A1* | 7/2009 | Hwang | G06F 9/45558 711/6 |
| 2010/0107158 A1* | 4/2010 | Chen | G06F 11/1438 718/1 |
| 2013/0246355 A1* | 9/2013 | Nelson | G06F 11/203 707/625 |

(Continued)

OTHER PUBLICATIONS

Daniel J. Scales et al., The Design and Evaluation of a Practical System for Fault-Tolerant Virtual Machines, May 11, 2010, retrieved online on Aug. 29, 2016, pp. 1-27. Retrieved from the Internet: <URL: https://webcache.googleusercontent.com/search?>.*

(Continued)

*Primary Examiner* — Thuy Dao
*Assistant Examiner* — Hanh T Bui

(57) ABSTRACT

A device may receive a virtual image of a first state of a first virtual machine. Session information of the state of the first virtual machine may be synchronized with a second state of a second virtual machine. The second state of the second virtual machine may become active when the first virtual machine becomes unavailable. The device may identify that the first virtual machine is unavailable; and output, based on the identifying, the virtual image of the first state to a particular third virtual machine, to cause the particular third virtual machine to restore the first state of the first virtual machine. The second state of the second virtual machine may become inactive when the first state is restored to the third virtual machine.

20 Claims, 10 Drawing Sheets

(56) References Cited

U.S. PATENT DOCUMENTS

| | | | |
|---|---|---|---|
| 2014/0325508 A1* | 10/2014 | Kruglick | G06F 9/45533 718/1 |
| 2015/0154046 A1* | 6/2015 | Farkas | G06F 9/485 718/1 |
| 2016/0019082 A1* | 1/2016 | Chandrasekaran | G06F 17/30088 718/1 |

OTHER PUBLICATIONS

Ashok Anand et al., Redundancy in Network Traffic: Findings and Implications, ACM, 2009, retrieved online on Aug. 29, 2016, pp. 37-48. Retrieved from the Internet: <URL: http://delivery.acm.org/10.1145/1560000/1555355/p37-anand.pdf?>.*

* cited by examiner (1) – Client traffic (2) – Keep-alive message(s) and/or session information (3) – Status message(s) and/or session information (1) – Client traffic (2) – Keep-alive message(s) and/or session information (3) – Status message(s) and/or session information (1) – Client traffic (2) – Keep-alive message(s) and/or session information (3) – Status message(s) and/or session information

VIRTUAL RESOURCE-BASED BACKUP

RELATED APPLICATIONS

The present application claims the benefit of U.S. Provisional Patent Application No. 62/013,463, titled "VIRTUAL RESOURCE-BASED BACKUP," which was filed on Jun. 17, 2014, and which is hereby incorporated by reference as though fully set forth herein.

BACKGROUND

A server device, or cluster of server devices (e.g., a hardware cluster), may implement a particular application. For example, a server device may implement an application in the context of providing a service to mobile devices in a cellular network (e.g., a traffic forwarding application, or the like). Additionally, or alternatively, a server device may virtualize the functionality of a network device (e.g., a network device implemented within a cellular network, such as a packet data network (PDN) gateway (PGW)). A service provider may deploy a redundant or backup server device to prevent service interruption in the event that a primary server device fails or is otherwise unavailable (e.g., unavailable for hardware and/or software maintenance, etc.).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may restore the functions of an application without the need to physically replace a specialized server device associated with the application (e.g., a server device having a particular hardware and software configuration). In some implementations, a group of server devices may provide a pool of virtual resources (e.g., virtual machines) from which a variety of specialized applications may run. For example, the pool of virtual resources may be used to implement primary and secondary states of a particular application.

A "primary state" may correspond to operations of a virtual machine in which an application or service runs. A "secondary state" may correspond to operations of a virtual machine that backs up the operations of the primary state. For example, the virtual machine of the secondary state may receive information, from the virtual machine of the primary state, session information and/or some other information that the virtual machine of the secondary state may use to take over the operations of the application in the event the virtual machine of the primary state fails.

In the event that a particular server device or particular virtual machine, associated with the primary state, fails (or otherwise is unavailable), the secondary state may be activated to prevent service interruption. The primary state may be periodically or intermittently saved, so that when a virtual machine associated with the primary state fails (or otherwise becomes unavailable), the primary state may be restored to another virtual machine. As a result of the restoration of the primary state, two redundant states may be present in order to prevent service interruption if a virtual machine associated with one of the states becomes unavailable. The primary state may be restored without the need to replace a specialized server device associated with the particular application, thereby reducing the downtime of the primary state in relation to when a specialized server device is replaced.

Figure 1:
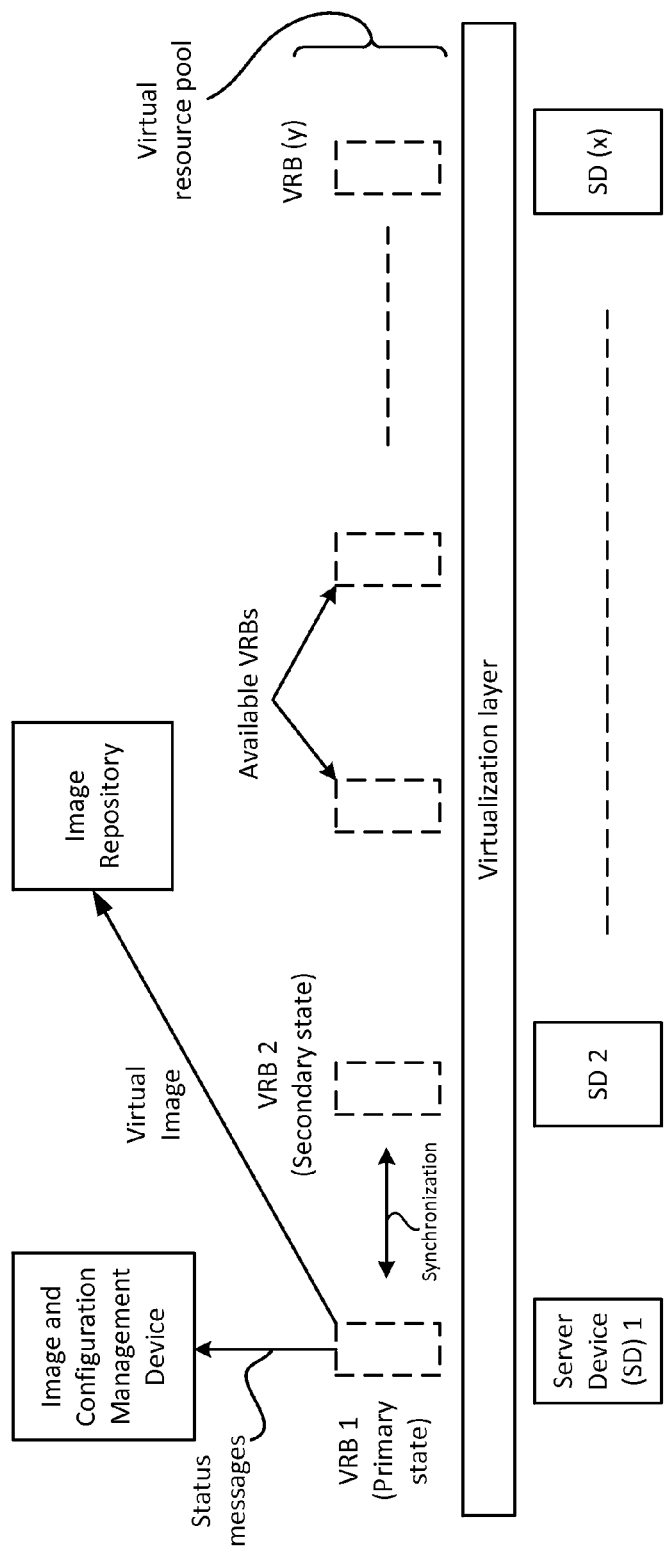
FIGS. 1 and 2 illustrate example overviews of an implementation described herein.
Figure 2:
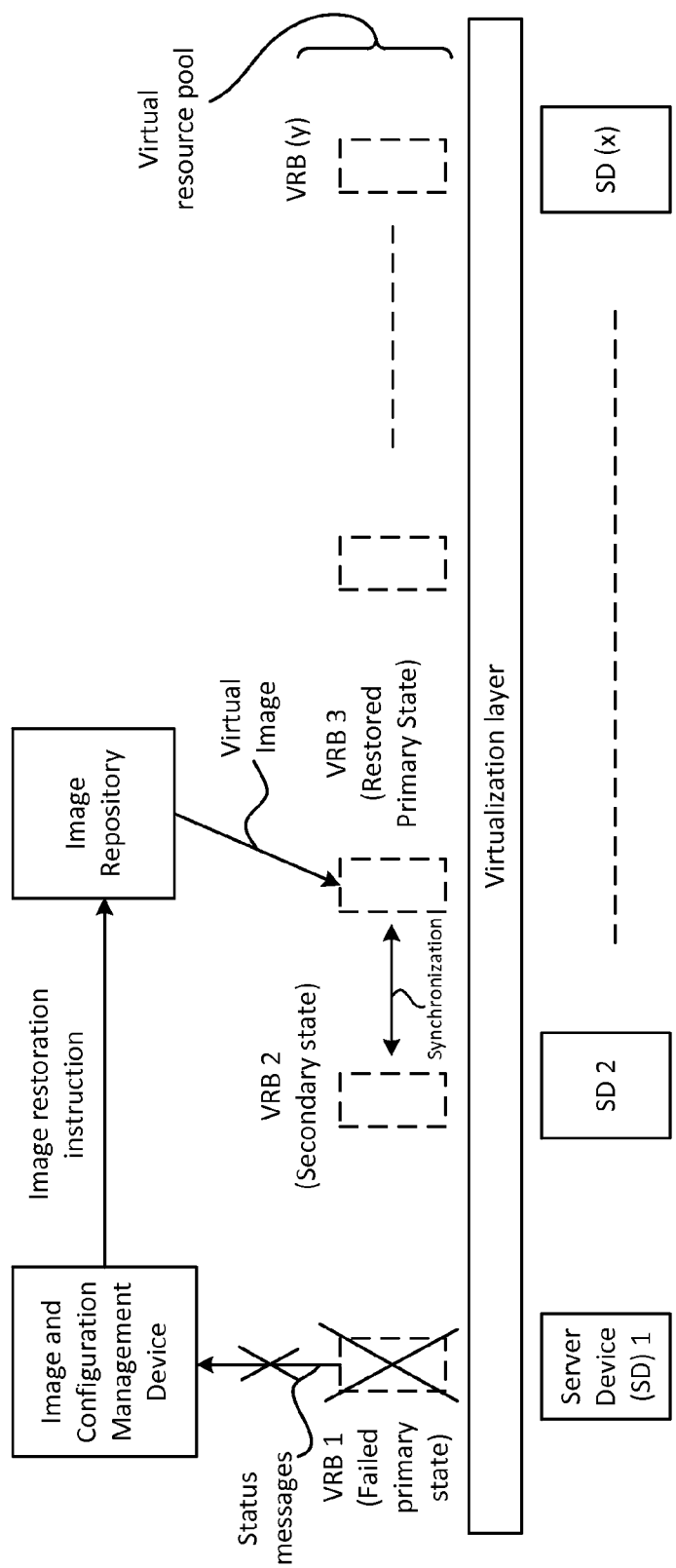

FIGS. 1 and 2 illustrate example overviews of an implementation described herein. As shown in FIG. 1 server devices 1 through X (where X is an integer greater than or equal to 1) may provide a virtual resource pool including virtual resource blocks (VRBs). Each VRB may include a virtual machine (VM) and/or some other type of virtualized resource or virtualized hardware. In FIG. 1, VRB 1 may implement a primary state of a particular application and VRB 2 may implement a secondary state that backs up the operations of the primary state.

As shown in FIG. 1, a virtual machine associated with VRB 1 may communicate with a virtual machine of VRB 2 to synchronize operational information that the virtual machine of VRB 2 may use to take over the operations of an application, in the event that the virtual machine of VRB 1 becomes unavailable. As further shown in FIG. 1, the virtual machine of VRB 1 may output a virtual image (e.g., a virtual image of the primary state) to an image repository. In some implementations, the virtual image may be a "snapshot" of the primary state, and may include software, operating systems, etc. used to implement a function or application. The virtual image may be a base building block that may be used to restore the primary state, as described in greater detail below with respect to FIG. 2. As further shown in FIG. 1, VRB 1 may output status messages to an image and configuration management device. In some implementations, a status message may indicate that the application of VRB 1 is functioning in accordance with particular performance parameters (e.g., the VM associated with VRB 1 is functioning, and/or other virtual resources associated with VRB 1 are functioning).

Referring to FIG. 2, assume that the primary state has failed (e.g., when a virtual machine of VRB 1 has failed, when a server device associated with VRB 1 has failed, and/or when the application of VRB 1 has failed). Given this assumption, the image and configuration management device may no longer receive status messages from VRB 1, and may therefore determine that the primary state has failed. Further, the virtual machine of VRB 2 may be activated and may take over the operations of the application implemented by the virtual machine of VRB 1 (e.g., to prevent service interruption). The image and configuration management device may output an image restoration instruction to the image repository to direct the image repository to restore the image of the primary state (e.g., an image obtained prior to the primary state failing), to an available VRB (e.g., VRB 3). Further, the virtual machine of VRB 2 may communicate with the virtual machine of VRB 3 to synchronize operational information so that the virtual machine of VRB 3 may resume operations of the application. As a result, the primary state may be restored to an available VRB without the need to replace a specialized server device associated with the application. Further, the primary state may be restored faster in relation to when a physical device is replaced, thereby reducing the time in which the operations of an application are not backed up.

In some implementations (e.g., when a physical server device fails), the server device may be replaced in order to restore VRBs that may have been lost when the server device failed. Since the server device may provide virtual resources that may be used to run a variety of specialized applications, the server device may be replaced with a non-specialized server device, (e.g., a commercial-off-the-shelf (COTS) device, or the like) in lieu of a specialized server device that may be more costly and/or time consuming to procure and deploy in relation to a non-specialized server device. Further, additional server devices may be implemented to add additional VRBs as needed.

Figure 3:
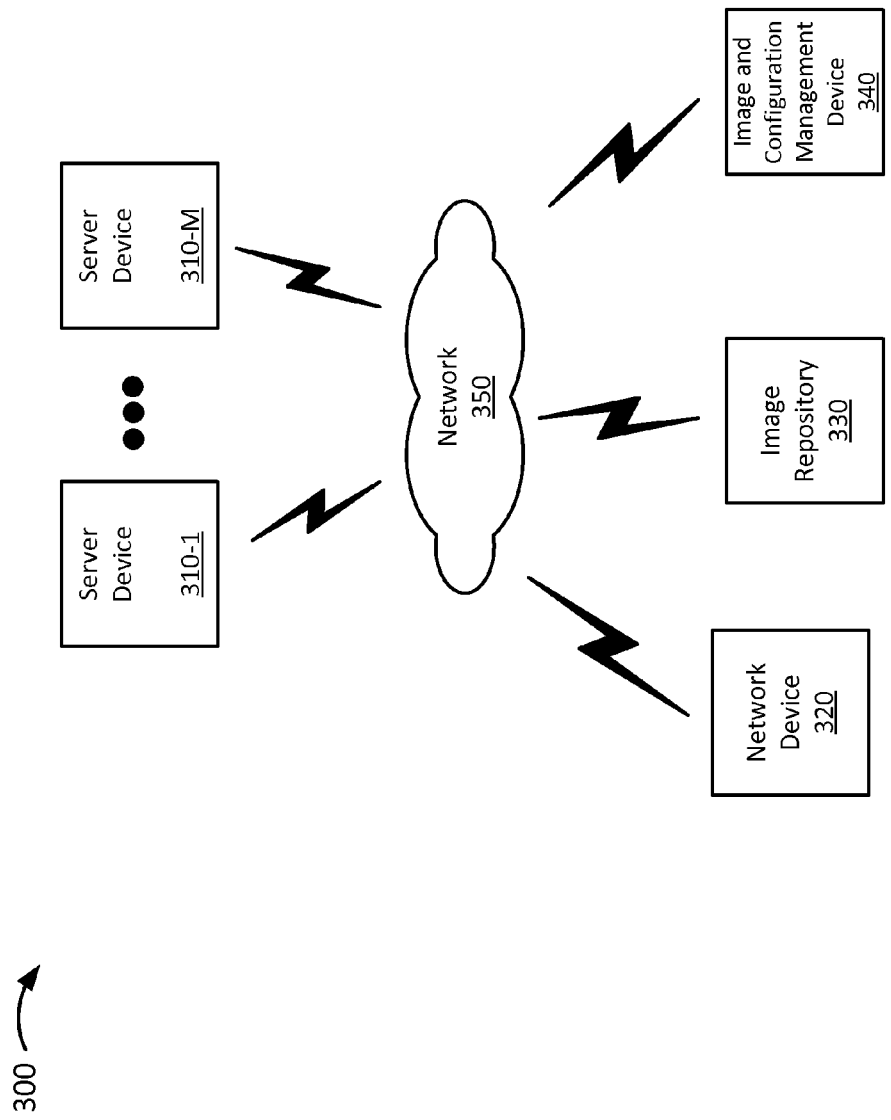
FIG. 3 illustrates an example environment in which systems and/or methods, described herein, may be implemented.

FIG. 3 is a diagram of an example environment 300 in which systems and/or methods described herein may be implemented. As shown in FIG. 3, environment 300 may include server devices 310-1 through 310-M (where M is an integer greater than or equal to 1, hereinafter sometimes referred to individually as "server device 310" and collectively as "server devices 310"), network device 320, image repository 330, image and configuration management device 340, and network 350.

Server device 310 may include one or more server devices that may provide a pool of VRBs that may be used to run a variety of specialized applications. Server device 310 may implement an application and/or virtual machines that function as network devices and/or specialized server devices associated with particular applications. For example, server device 310 may function as a server or network device in a cellular network, (e.g., a packet data network (PDN) gateway (PGW), a Home Agent (HA) device, or the like). Server devices 310 may implement a primary state associated with an application, and a secondary state to back up the operations of the primary state (e.g., by syncing session information and/or other operational information with a virtual machine of the primary state). In some implementations, the primary state may be implemented by one VM associated with one server device 310, and the secondary state may be implemented by another VM implemented by another server device 310. Additionally, or alternatively, the primary state and secondary state may be implemented by separate VMs running on a single server device 310.

Operational data may be synchronized between VMs associated with the primary and secondary states so that the secondary state may back up the operations of the primary state. For example, configuration files that include configuration parameters may be synced between VMs associated with primary and secondary states. Further, session information may be synced between VMs associated with primary and secondary states. As an example, when server device 310 functions as a PGW, session information identifying the registration status of user devices may be synced between the primary and secondary states.

Server device 310 may output a virtual image of a primary state to image repository 330 so that the virtual image can be loaded in order to restore the primary state. For example, server device 310 may output the virtual image after a change to infrastructure associated with the virtual image (e.g., after the installation of a software patch, a revision to an application, a security update, a maintenance update, etc.) Additionally, or alternatively, server device 310 may intermittently or periodically output the virtual image (e.g., each day, each week, or at some other interval). In some implementations, server device 310 may receive a virtual image from image repository 330 (e.g., a virtual image corresponding to a primary state). Server device 310 may load the virtual image in order to restore the primary state using the virtual image containing the most recent software updates, patches, etc. Server device 310 may output, to image and configuration management device 340, a status message indicating that a primary state is functioning within operating parameters. The status message may also be outputted to a VM of the secondary state associated with another server device 310 (e.g., so that the VM of the secondary state may activate in the event that the VM of the primary state becomes unavailable).

Network device 320 may include a router, a hub, a gateway, an access point, and/or some other device that may transmit traffic to and/or from server device 310. For example, when server device 310 implements an application and/or VM that functions as a PGW for a cellular network, network device 320 may transmit and/or receive data in the context of establishing a session between a user device, associated with the cellular network, and server device 310 (e.g., the VM that functions as a PGW). Further, network device 320 may transmit session data (e.g., information identifying an established session between the VM functioning as the PGW and the user device) to a VM associated with a secondary state (e.g., a state that backs up the operations of the PGW VM).

Image repository 330 may include one or more server devices that store virtual images of a VM associated with a primary state. In some implementations, image repository 330 may periodically or intermittently receive the virtual images from server device 310. For example, image repository 330 may receive virtual images when corresponding VMs are shut down. Additionally, or alternatively, image repository 330 may receive virtual images from server device 310 after a software update, security patch, and/or some other type of update. Additionally, or alternatively, image repository 330 may receive virtual images at any other time (e.g., server devices 310 may provide the virtual images each day, each week, or at some other interval). In some implementations, image repository 330 may store only the most recent virtual image of a particular VM (e.g., a virtual image having the most up to date software revisions, security patches, etc.). Alternatively, image repository 330 may store a particular quantity of the most recent virtual images. Image repository 330 may output a virtual image to server device 310 based on receiving an image restoration instruction from image and configuration management device 340. In some implementations, image repository 330 may be an external share memory to store images associated with multiple primary states implemented by multiple server devices 310. In some implementations, image repository 330 may be implemented as a diskless blade device.

Image and configuration management device 340 may include one or more server devices that may store information identifying VRBs implemented by server devices 310, and attributes of each VRB. For example, image and configuration management device 340 may store information identifying whether a particular VRB is available or in use, whether the VRB is associated with a primary or secondary state, the function of the VRB (e.g., the application or device associated with the VRB), virtualized hardware configuration information of the VRB, a particular server device 310 associated with the VRB, and/or some other information regarding the VRB. In some implementations, image and configuration management device 340 may store information identifying the geographic location associated with the VRB. For example, image and configuration management device 340 may store information identifying that the VRB is associated with a PGW that serves user devices associated with a particular geographic location. Image and configuration management device 340 may receive status messages from server device 310 (e.g., from a VM of a primary state), and may determine that a primary state is unavailable if a status message has not been received within a particular threshold period of time. Based on determining that the primary state is unavailable, image and configuration management device 340 may generate an instruction to direct image repository 330 to output a virtual image, corresponding to the primary state, to server device 310 in order to restore the primary state.

Image and configuration management device 340 may store affinity rules and/or anti-affinity rules identifying a particular VRB in which a virtual image should be loaded based on the attributes of the VRB and/or attributes of the virtual image. For example, image and configuration management device 340 may store an affinity rule and/or an anti-affinity rule indicating that a virtual image associated with a particular application should be loaded using a VRB associated with the particular application. In some implementations, image and configuration management device 340 may store a recent version of configuration files associated with an application. When a primary state is restored, image and configuration management device 340 may output the most recent version of the configuration files to a VM of a restored primary state.

Network 350 may include one or more wired and/or wireless networks. For example, network 350 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 350 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 300 is not limited to what is shown in FIG. 3. In practice, environment 300 may include additional devices and/or networks; fewer devices and/or networks; different devices and/or networks; or differently arranged devices and/or networks than illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 4:
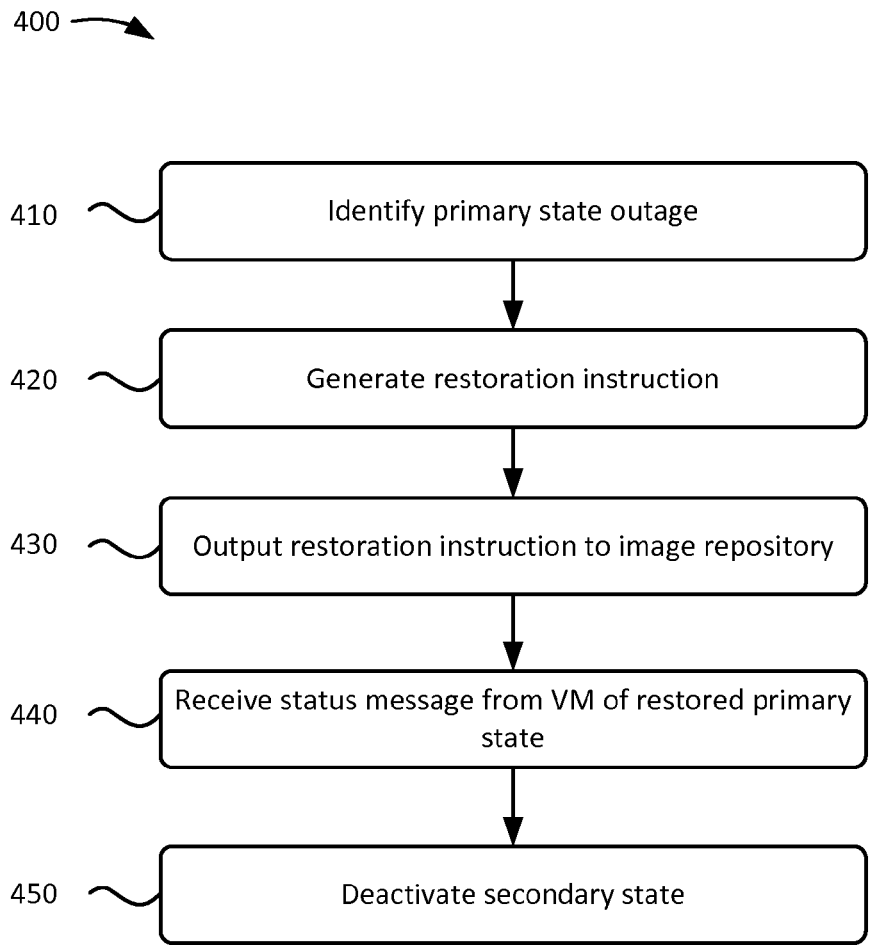
FIG. 4 illustrates a flowchart of an example process for restoring a primary state after an outage of the primary state.

FIG. 4 illustrates a flowchart of an example process 400 for restoring a primary state after an outage of the primary state. In some implementations, process 400 may be performed by image and configuration management device 340. In some implementations, some or all of blocks of process 400 may be performed by one or more other devices.

As shown in FIG. 4, process 400 may include identifying a primary state outage (block 410). For example, image and configuration management device 340 may identify an outage for a primary state, associated with a particular application, when image and configuration management device 340 does not receive a status message from a VM associated with the primary state within a threshold period of time. In some implementations, image and configuration management device 340 may identify the outage when the primary state has become unavailable (e.g., when the primary state has been shut down to perform hardware and/or software maintenance on the server device 310 associated with the primary state). Additionally, or alternatively, image and configuration management device 340 may identify the outage when the server device 310 experiences a hardware failure, a power failure, or the like. Additionally, or alternatively, image and configuration management device 340 may identify the outage if the VM associated with the primary state malfunctions or crashes. In some implementations, a secondary state may become active in order to prevent service interruption when the primary state becomes unavailable. Image and configuration management device 340 may then receive status messages from the active secondary state. Image and configuration management device 340 may determine that the VM of the primary state is unavailable when receiving the status messages from the VM of the secondary state.

Process 400 may also include generating a restoration instruction (block 420), and outputting the restoration instruction an image repository. For example, image and configuration management device 340 may generate a restoration instruction that directs image repository 330 to output the virtual image of the primary state (e.g., the last or most recent virtual image that was saved to the image repository 330 prior to the primary state becoming unavailable). In some implementations, the restoration instruction may be based on affinity rules, anti-affinity rules, and/or VRB attribute information stored by image and configuration management device 340. As described above, image and configuration management device 340 may store information identifying the structure of VRBs provided by server devices 310 and the attributes of the VRBs. For example, image and configuration management device 340 may store information identifying whether a particular VRB is available or in use, whether the VRB is associated with a primary or secondary state, the function of the VRB (e.g., the application or device associated with the VRB), virtualized hardware configuration information of the VRB, a particular server device 310 associated with the VRB, and/or some other information regarding the VRB. Image and configuration management device 340 may also store affinity rules and/or anti-affinity rules identifying a particular VRB in which a virtual image should be loaded based on the attributes of the VRB and/or attributes of the virtual image. For example, image and configuration management device 340 may store an affinity rule indicating that a virtual image associated with a particular application should be loaded using a VRB associated with the particular application. In other words, in some implementations, affinity rules may indicate virtual resources and/or functionality that should be made available by a particular VRB, in order for that VRB to be a candidate for loading the virtual image.

Based on such information, image and configuration management device 340 may identify a particular VRB having particular attributes. For example, image and configuration management device 340 may identify a particular VRB that is available for use and is configured to run the same application as that of the unavailable primary state. Image and configuration management device 340 may generate a restoration instruction that directs image repository 330 to output the virtual image of the primary state to a particular server device 310 associated with the identified VRB having the particular attributes. For example, the restoration instruction may include an identifier (ID) associated with the virtual image of the primary state, an ID of the VRB, and/or an ID of the server device 310 associated with the identified VRB.

Image repository 330 may receive the restoration instruction, identify the particular virtual image based on the ID of the virtual image, and output the virtual image to server device 310. When outputting the virtual image, image repository 330 may also output the ID of the identified VRB. Server device 310 may then restore the virtual image of the primary state to a VM associated with the identified VRB and output a status message to image and configuration management device 340 indicating that the primary state has been restored. Once the virtual image has been restored, the VM of the primary state may synchronize session information with the VM of the secondary state. In some implementations, image and configuration management device 340 may also output configuration files and/or some other information that may be used by a VM of the restored primary state to function.

Process 400 may further include receiving a status message from the VM of the restored primary state (block 440) and deactivating a secondary state (block 450). For example, image and configuration management device 340 may receive a status message from the VM of the restored primary state. Based on receiving the status message, image and configuration management device 340 may deactivate a secondary state used to back up the original primary state before the original primary state became unavailable. In some implementations, the secondary state that became active after the original primary state became unavailable may function as the primary state, and the newly restored primary state may function as a new secondary state.

Figure 5:
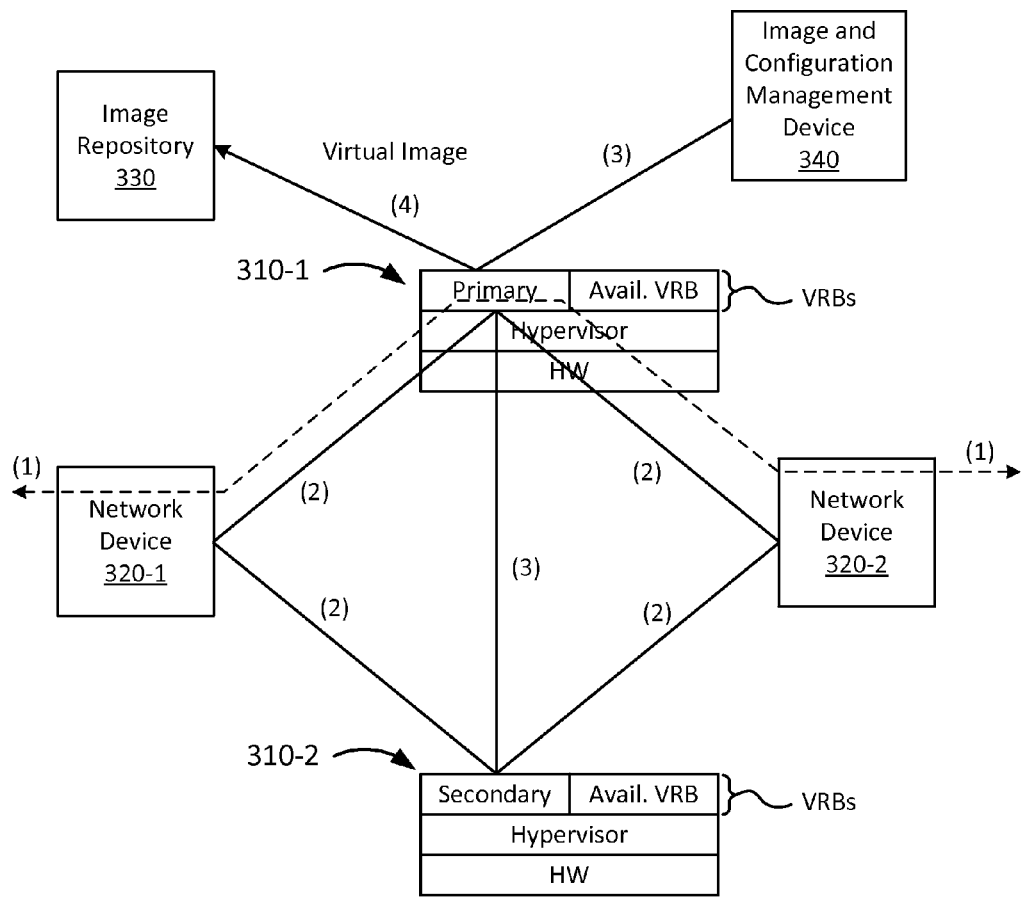
FIG. 5 illustrates an example implementation for concurrently running a primary state and a secondary state using virtualized resources.

FIG. 5 illustrates an example implementation for concurrently running a primary state and a secondary state using virtualized resources. As shown in FIG. 5, server device 310-1 and server device 310-2 may each include a hardware (HW) layer and a Hypervisor layer via which VRBs may be provided. Server device 310-1 may implement an application (corresponding to a primary state) using virtualized resources associated with a VRB. Server device 310-2 may implement a secondary state of the application in order to back up the operations of the primary state. Server device 310-1 may transmit and/or receive client traffic (lines marked "(1)") via network device 320-1 and network device 320-2 (e.g., client traffic associated with implementing the application). As further shown in FIG. 5, keep-alive messages and/or session information (lines marked "(2)") may be transmitted between neighboring devices (network device 320-1 and server device 310-1; network device 320-1 and server device 310-2; network device 320-2 and server device 310-1; and network device 320-2 and server device 310-2). These messages may be outputted in order to keep the primary state and secondary state in sync so that the secondary state may back up the operations of the primary state. In some implementations, the session information may be transmitted from a VM of the primary state to a VM of the secondary state via a session redundancy protocol (SRP).

As further shown in FIG. 5, server device 310-1 may output status messages (lines marked "(3)") to image and configuration management device 340 and server device 310-2. Additionally, or alternatively, server device 310-1 may output session information directly to server device 310-2 in order to keep the primary state and secondary state in sync so that the secondary state may back up the operations of the primary state. In some implementations, the session information may not be transmitted to image and configuration management device 340 (e.g., to reduce network traffic). Further, server device 310-1 may output a virtual image (line marked "(4)") of the primary state to image repository 330 (e.g., so that the primary state may be restored using the virtual image). In some implementations, the virtual image may include information regarding a VM disk, memory, and/or other virtualized devices associated with the primary state. Additionally, or alternatively, the virtual image may include configuration files that may include a loopback address associated with an application or service of the primary state.

Figure 6:
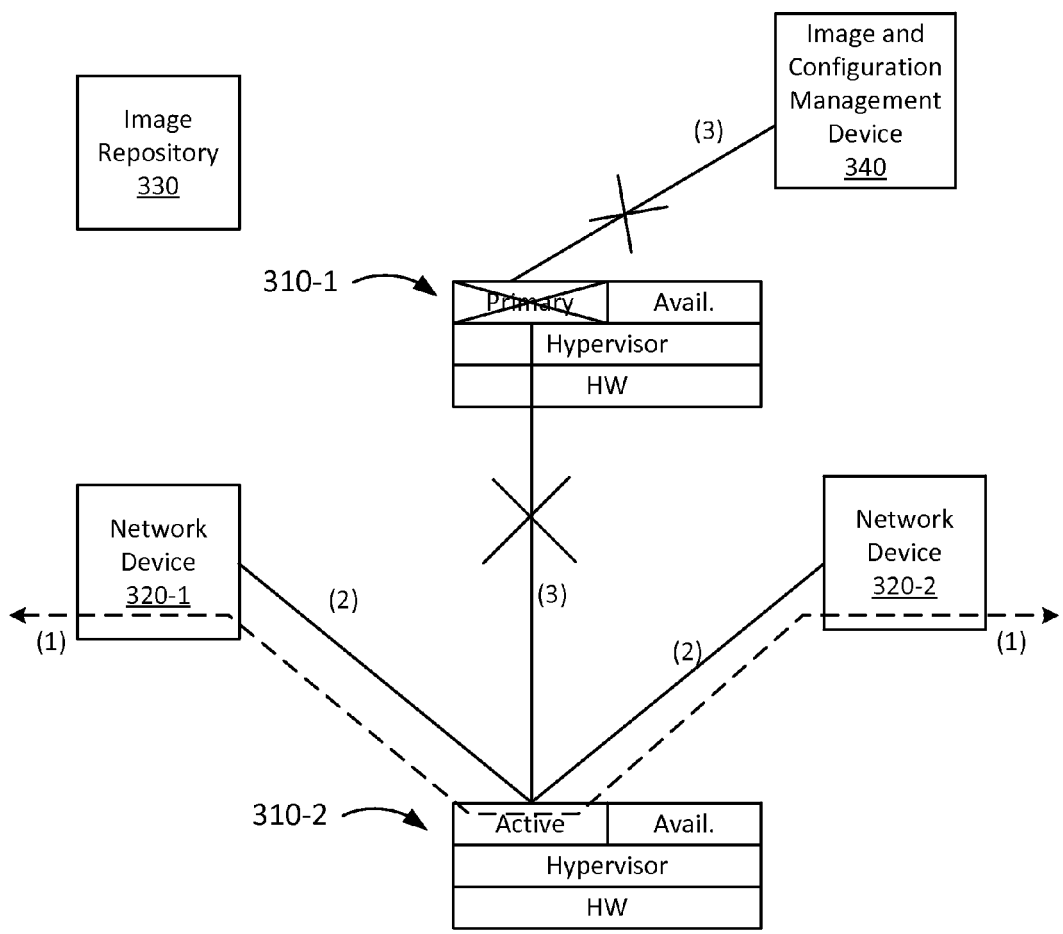
FIGS. 6 and 7 illustrate example implementations for activating a secondary state when a primary state becomes unavailable and restoring a primary state using available virtual resources.
Figure 7:
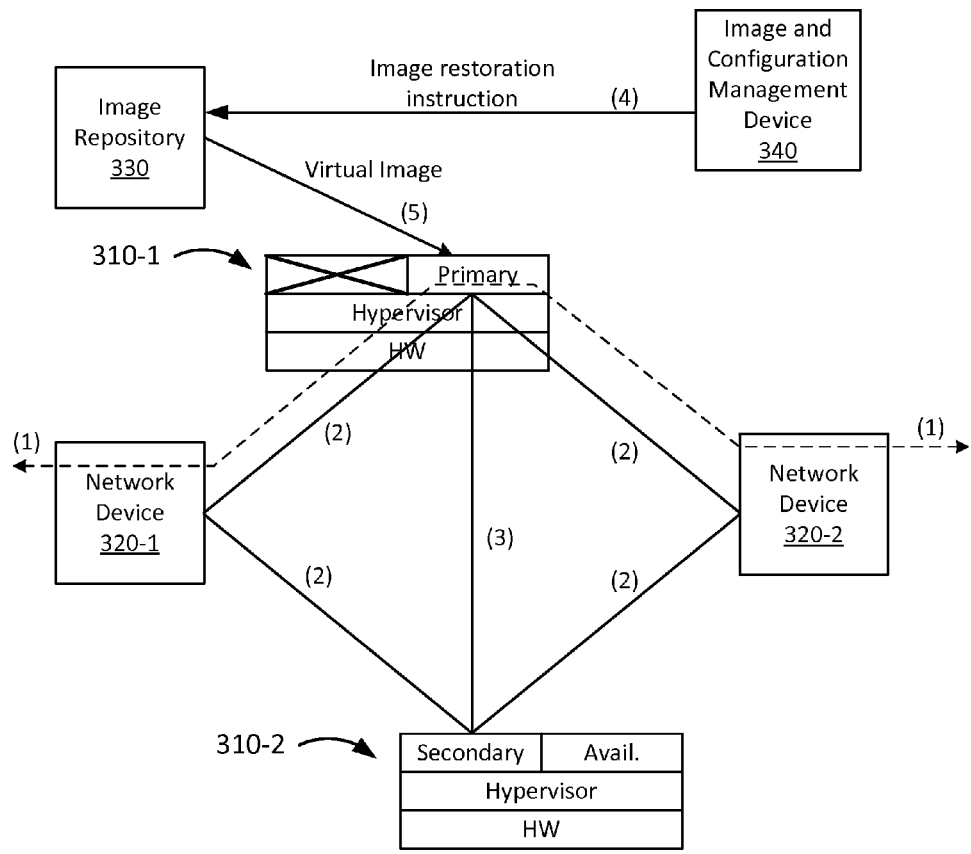

FIGS. 6 and 7 illustrate an example implementation for activating a secondary state when a primary state becomes unavailable and restoring a primary state using available virtual resources. As shown in FIG. 6, the secondary state of server device 310-2 may become active when the primary state of server device 310-1 becomes unavailable (e.g., when server device 310-2 and image and configuration management device 340 do not receive status messages from server device 310-1). For example, server device 310-2, which previously was associated with the secondary state, may become active. For example, server device 310-2 may transmit and/or receive data to and/or from network devices 320-1 and 320-2 when the primary state becomes unavailable on server device 310-1. In some implementations, the primary state may become unavailable even if the hardware layer of server device 310-1 does not experience an outage or failure. For example, the primary state may become unavailable if the VM of the primary state is shut down or malfunctions.

Referring to FIG. 7, image and configuration management device 340 may output an image restoration instruction to image repository 330 as shown in line (4) (e.g., based on determining that the primary state is unavailable). Based on receiving the image restoration instruction, image repository 330 may output a virtual image (line (5)), corresponding to the primary state prior to the outage of the primary state, to server device 310-1. Server device 310-1 may then load the virtual image to an available VRB. In some implementations, the VM of the primary state may communicate with server device 310-2, network device 320-1, and/or network device 320-2 to synchronize session information and/or other information. For example, the VM of the primary state may synchronize information from the VM of the secondary state. Once synchronized, the primary state may become active and client traffic may be transmitted to and/or from the VM of the primary state.

Figure 8:
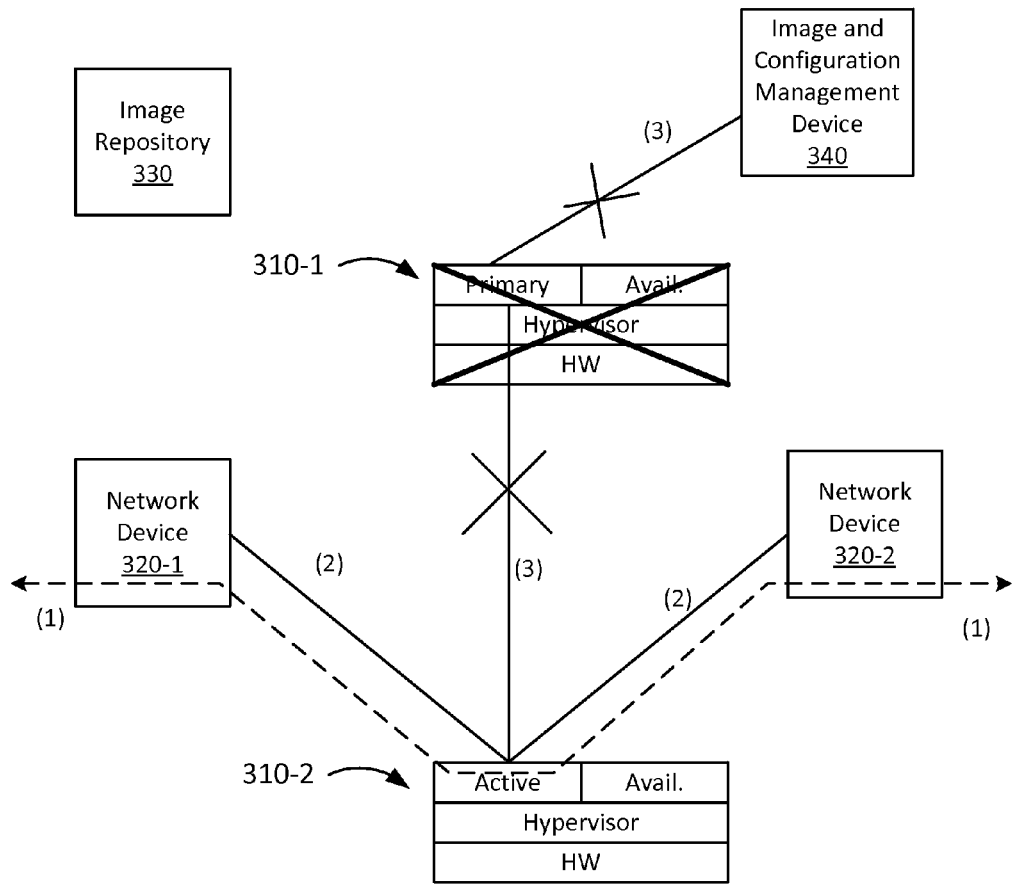
FIGS. 8 and 9 illustrate example implementations for activating a secondary state when a primary state becomes unavailable and restoring a primary state using available virtual resources (e.g., in situations where physical hardware associated with the primary state becomes unavailable)
Figure 9:
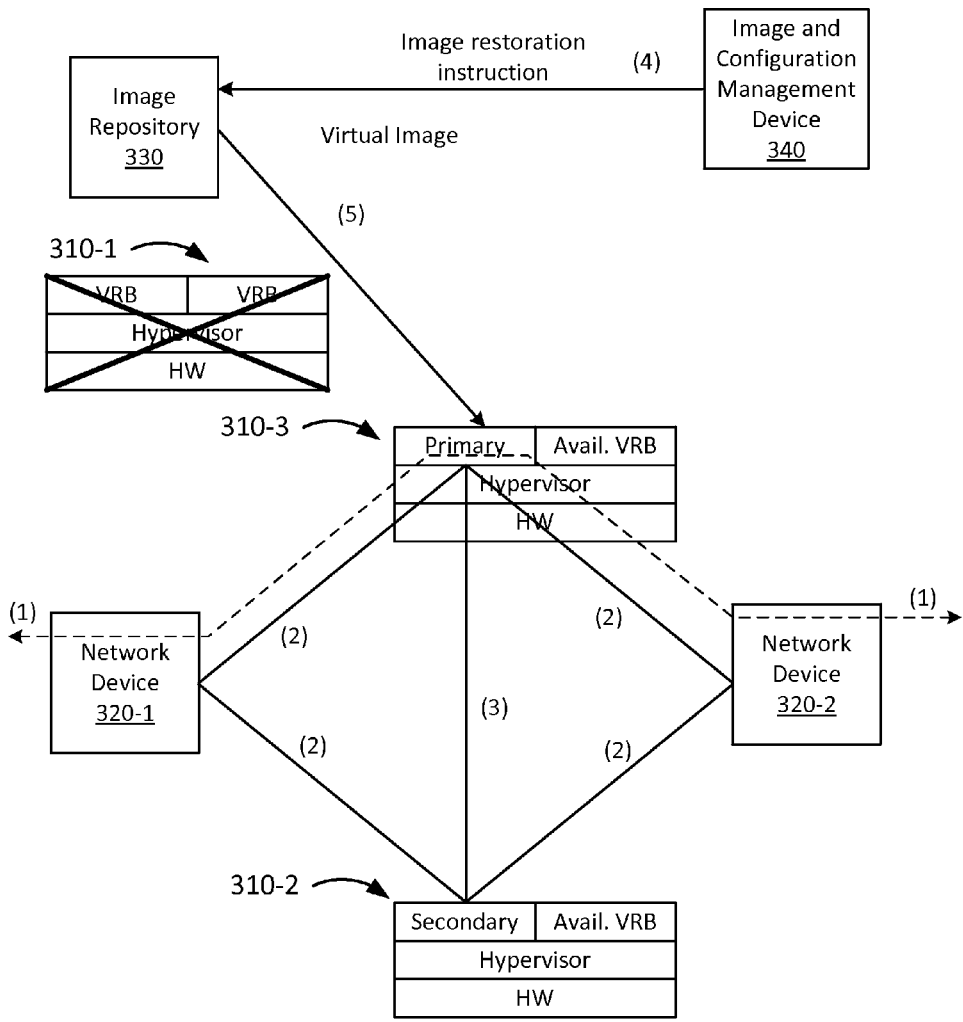

FIGS. 8 and 9 illustrate example implementations for activating a secondary state when a primary state becomes unavailable and restoring a primary state using available virtual resources (e.g., in situations where physical hardware associated with the primary state becomes unavailable). As shown in FIG. 8, the secondary state of server device 310-2 may become active when the primary state of server device 310-1 becomes unavailable (e.g., when server device 310-2 and image and configuration management device 340 do not receive status messages from server device 310-1). For example, server device 310-2 may transmit and/or receive data to and/or from network devices 320-1 and 320-2 when the primary state becomes unavailable on server device 310-1. As shown in FIG. 8, the primary state may become unavailable when the hardware layer of server device 310-1 experiences an outage or failure. For example, the primary state may become unavailable if the hardware of server device 310-1 is shut down, malfunctions, experiences a power failure, etc.

Referring to FIG. 9, image and configuration management device 340 may output an image restoration instruction (line (4)) to image repository 330 (e.g., based on determining that the primary state is unavailable, such as when physical hardware associated with the primary state becomes unavailable). Based on receiving the image restoration instruction, image repository 330 may output a virtual image (line (5)), corresponding to the primary state prior to the outage of the primary state, to server device 310-3 (e.g., a different physical server device than the physical server device in which the primary state was previously implemented). Server device 310-3 may then load the virtual image to an available VRB. In some implementations, the VM of the primary state may communicate with server device 310-2, network device 320-1, and/or network device 320-2 to synchronize session information and/or other information. Once synchronized, primary state may become active and client traffic may be transmitted to and/or from the VM of the primary state.

Figure 10:
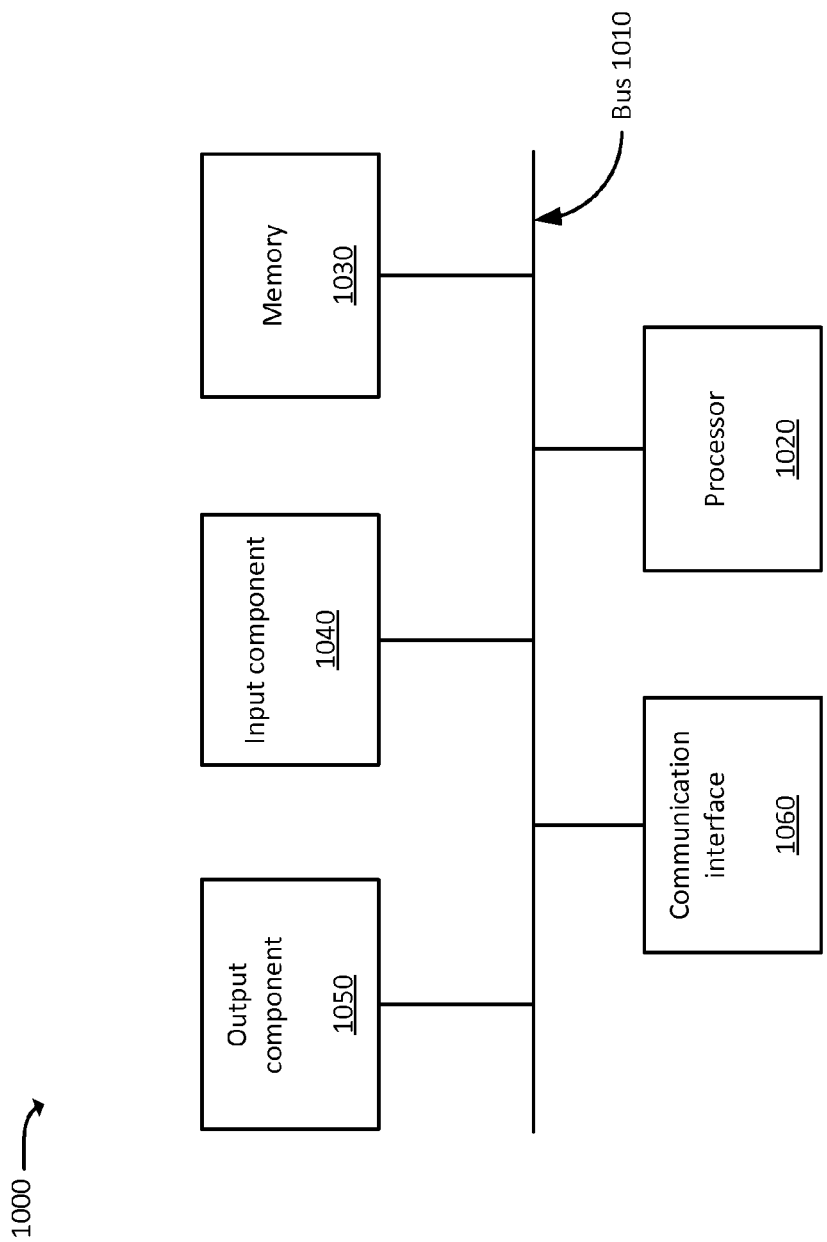
FIG. 10 illustrates example components of one or more devices, according to one or more implementations described herein.

FIG. 10 is a diagram of example components of device 1000. One or more of the devices described above (e.g., with respect to FIGS. 1-3, and 5-9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, and 5-9), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, a virtual image of a first state of a first virtual machine,
      wherein session information of the first state of the first virtual machine is synchronized with a second state of a second virtual machine,
      wherein the second state of the second virtual machine becomes active when the first virtual machine becomes unavailable;
   identifying, by the device, that the first virtual machine is unavailable;
   selecting, by the device, a third virtual machine, out of a plurality of virtual machines, the selecting including:
      determining a set of applications associated with the first virtual machine, and
      identifying one or more virtual machines, out of the plurality of virtual machines, that are associated with the set of applications associated with the first virtual machine,
      wherein the selected third virtual machine is a particular one of the identified one or more virtual machines;
   outputting, by the device and based on identifying that the first virtual machine is unavailable, the virtual image of the first state to the selected third virtual machine, to cause the third virtual machine to restore the first state of the first virtual machine,
      wherein the second state of the second virtual machine becomes inactive when the first state is restored to the third virtual machine;
   receiving a status message from the third virtual machine after outputting the virtual image; and
   causing the second virtual machine to discontinue receiving traffic on behalf of the first virtual machine after receiving the status message from the third virtual machine.

2. The method of claim 1, further comprising:
   determining a geographic location associated with the third virtual machine,
   wherein selecting the third virtual machine, of the plurality of virtual machines, is further based on the determined geographic location associated with the third virtual machine.

3. The method of claim 1, wherein identifying that the first virtual machine is unavailable includes determining that a status message has not been received from the first virtual machine within a threshold period of time.

4. The method of claim 1, wherein identifying that the first virtual machine is unavailable is based on identifying that the first state of the second virtual machine has become active.

5. The method of claim 1, wherein identifying that the first virtual machine is unavailable is based on identifying that physical hardware associated with the first virtual machine has shut down.

6. The method of claim 1, wherein identifying that the first virtual machine is unavailable is based on identifying that virtual resources of the first virtual machine have been shut down or are unavailable, but that physical hardware associated with the first virtual machine has not shut down.

7. The method of claim 1, wherein the second virtual machine resides on a different physical hardware device than the first virtual machine.

8. The method of claim 1, wherein the second virtual machine resides on a same physical hardware device as the first virtual machine.

9. A system comprising:
   a non-transitory memory device storing a plurality of processor-executable instructions; and
   a processor configured to execute the processor-executable instructions, wherein executing the processor-executable instructions causes the processor to:
      receive a virtual image of a first state of a first virtual machine,
         wherein session information of the first state of the first virtual machine is synchronized with a second state of a second virtual machine,
         wherein the second state of the second virtual machine becomes active when the first virtual machine becomes unavailable;
      identify that the first virtual machine is unavailable;
      select a third virtual machine, out of a plurality of virtual machines, the selecting including:
         determining a set of applications associated with the first virtual machine, and
         identifying one or more virtual machines, out of the plurality of virtual machines, that are associated with the set of applications associated with the first virtual machine,
         wherein the selected third virtual machine is a particular one of the identified one or more virtual machines;
      output, based on identifying that the first virtual machine is unavailable, the virtual image of the first state to the selected third virtual machine, to cause the third virtual machine to restore the first state of the first virtual machine, wherein the second state of the second virtual machine becomes inactive when the first state is restored to the third virtual machine;

receive a status message from the third virtual machine after outputting the virtual image; and cause the second virtual machine to discontinue receiving traffic on behalf of the first virtual machine after receiving the status message from the third virtual machine.

10. The system of claim 9, wherein executing the processor-executable instructions further causes the processor to:

determine a geographic location associated with the third virtual machine, wherein the selection of the third virtual machine, of the plurality of virtual machines, is further based on the geographic location associated with the third virtual machine.

11. The system of claim 9, wherein executing the processor-executable instructions, to identify that the first virtual machine is unavailable, causes the processor to determine that a status message has not been received from the first virtual machine within a threshold period of time.

12. The system of claim 9, wherein executing the processor-executable instructions, to identify that the first virtual machine is unavailable, causes the processor to identify that the first virtual machine is unavailable based on identifying that the first state of the second virtual machine has become active.

13. The system of claim 9, wherein executing the processor-executable instructions, to identify that the first virtual machine is unavailable, causes the processor to identify that the first virtual machine is unavailable based on identifying that physical hardware associated with the first virtual machine has shut down.

14. The system of claim 9, wherein executing the processor-executable instructions, to identify that the first virtual machine is unavailable, causes the processor to identify that the first virtual machine is unavailable based on identifying that virtual resources of the first virtual machine have been shut down or are unavailable, but that physical hardware associated with the first virtual machine has not shut down.

15. The system of claim 9, wherein the second virtual machine resides on a different physical hardware device than the first virtual machine.

16. The system of claim 9, wherein the second virtual machine resides on a same physical hardware device as the first virtual machine.

17. A non-transitory computer-readable medium, storing processor-executable instructions, which when executed by a processor of a device, cause the processor to:

receive a virtual image of a first state of a first virtual machine, wherein session information of the first state of the first virtual machine is synchronized with a second state of a second virtual machine, wherein the second state of the second virtual machine becomes active when the first virtual machine becomes unavailable;

identify that the first virtual machine is unavailable;

select a third virtual machine, out of a plurality of virtual machines, the selecting including:

determining a set of applications associated with the first virtual machine, and identifying one or more virtual machines, out of the plurality of virtual machines, that are associated with the set of applications associated with the first virtual machine, wherein the selected third virtual machine is a particular one of the identified one or more virtual machines;

output, based on identifying that the first virtual machine is unavailable, the virtual image of the first state to the selected third virtual machine, to cause the third virtual machine to restore the first state of the first virtual machine, wherein the second state of the second virtual machine becomes inactive when the first state is restored to the third virtual machine;

receive a status message from the third virtual machine after outputting the virtual image; and cause the second virtual machine to discontinue receiving traffic on behalf of the first virtual machine after receiving the status message from the third virtual machine.

18. The non-transitory computer-readable medium of claim 17, wherein the processor-executable instructions further include instructions to:

determine a geographic location associated with the third virtual machine, wherein the selection of the third virtual machine, of the plurality of virtual machines, is further based on the geographic location associated with the third virtual machine.

19. The non-transitory computer-readable medium of claim 17, the processor-executable instructions, to identify that the first virtual machine is unavailable, include processor-executable instructions to determine that a status message has not been received from the first virtual machine within a threshold period of time.

20. The non-transitory computer-readable medium of claim 17, the processor-executable instructions, to identify that the first virtual machine is unavailable, include processor-executable instructions to identify that physical hardware associated with the first virtual machine has shut down.

* * * * *